United States Patent [19]

Tsuchiya et al.

[11] Patent Number: 5,196,264
[45] Date of Patent: Mar. 23, 1993

[54] POROUS SINTERED BODY AND METHOD OF MANUFACTURING SAME

[75] Inventors: Yoshinobu Tsuchiya, Fujisawa; Ken Kurabayashi, Chigasaki; Hiroyoshi Moroboshi, Yokohama; Akio Yoshida, Kamakura; Tadakuni Nishitani, Yokohama; Yoriaki Niida, Yamato, all of Japan

[73] Assignee: Isuzu Motors Limited, Tokyo, Japan

[21] Appl. No.: 567,164

[22] Filed: Aug. 14, 1990

[30] Foreign Application Priority Data

Aug. 22, 1989 [JP] Japan .................................. 1-215278

[51] Int. Cl.$^5$ .................................................. B05D 3/00
[52] U.S. Cl. ...................................... 428/328; 428/325; 428/402; 428/357
[58] Field of Search ................. 428/325, 402, 357, 328

[56] References Cited

U.S. PATENT DOCUMENTS 3,566,203 2/1971 Maguire .......................... 361/540

Primary Examiner—Edith Buffalow
Attorney, Agent, or Firm—Staas & Halsey

[57] ABSTRACT

Fine powder particles of an electrically conductive or semiconductive material, which have a diameter of 10 $\mu$m or less, are pressurized, and at the same time, a pulse voltage is applied between the fine powder particles to produce an electric discharge therebetween. The fine powder particles are fused together at areas where they contact each other, thereby producing a porous sintered body. The porous sintered body is made of only an electrically conductive or semiconductive material without using any particle binders whatsoever.

16 Claims, 3 Drawing Sheets

POROUS SINTERED BODY AND METHOD OF MANUFACTURING SAME

BACKGROUND OF THE INVENTION

The present invention relates to a porous sintered body and a method of manufacturing such a porous sintered body, and more particularly to a porous sintered body for use in a filter which deodorizes a liquid or a gas or removes contaminating substances, or for use as a polarized electrode in a capacitor, and a method of manufacturing such a porous sintered body.

Recently, filters made of nonwoven metal fabric are used for deodorizing liquids or gases or for removing contaminating substances. Such a nonwoven metal fabric filter typically comprises a compressed lamination of metal fibers such as slender fibers of stainless steel, the compressed lamination being heated to fuse the metal fibers. Since the metal fibers are not subject to corrosion, the filter is not corroded even when it is exposed to air or liquids for a long period of time.

Filters made of nonwoven fibrous activated carbon fabric are also used to deodorize liquids. The activated carbon fibers cannot be bonded together in regions where they are held in contact with each other. Therefore, the filters made of nonwoven fibrous activated carbon fabric are kept under pressure at all times by some process, so that the filters are compressed during use.

There are also employed compressed sintered filters which are made of bonded spherical particles of metal or activated carbon.

Since the nonwoven fabric is pressurized and sintered, the nonwoven fabric filters have a porosity of 60% or greater, and also have uneven pores between the metal fibers.

The filters made of fibrous activated carbon require some means for compressing themselves at all during usage, and hence are complex in structure. The filters of this type are also disadvantageous in that the pores between the fibers are uneven or irregular.

The compressed sintered filters are fabricated by compressing and sintering metal or activated carbon particles which are mixed with a particle binder. After the filters are sintered, the particle binder is removed. If the particle binder is not thoroughly removed, then the fabricated filter has poor filter characteristics.

The conventional filters of the types referred to above are further disadvantageous in that the pores between the fibers or particles are not of uniform size. If a compressed sintered filter were manufactured using fibers or particles having diameters smaller than several $\mu$m, the fibers or particles would be melted, substantially entirely clogging the pores. Therefore, fibers or particles of very small diameters cannot be employed. The compressed sintered filters are thus not suitable for use in removing germs which are about 10 $\mu$m in size, such as colitis bacteria.

Porous sintered bodies made up of fibers or particles of activated carbon have a small space factor per unit volume and a small surface area per unit volume since the size of the fibers or the diameter of the particles is large. If a polarized electrode of an electric double layer capacitor is constructed of a porous sintered body, then an electric double layer capacitor of high capacitance cannot be obtained. Furthermore, if the particle binder is not sufficiently removed then the manufactured electric double layer capacitor fails to achieve desired characteristics sufficiently.

SUMMARY OF THE INVENTION

It is an object of the present invention to provide a porous sintered body which is made of only fine particles of electrically conductive material or electrically semiconductive material without using a particle binder, and a method of manufacturing such a porous sintered body.

According to the present invention, there is provided a porous sintered body comprising fine particles of one of an electrically conductive material and an electrically semiconductive material, the fine particles having a diameter of 10 $\mu$m or smaller, the fine particles being fused together at areas of contact with each other under a voltage applied between the fine particles.

According to another embodiment of the present invention, there is also provided a porous sintered body comprising a uniformly dispersed mixture of fine particles of an electrically conductive material and an electrically semiconductive material, the fine particles having a diameter of 10 $\mu$m or smaller, the fine particles being fused together at areas of contact with each other under a voltage applied between the fine particles.

According to the present invention, there is further provided a method of manufacturing a porous sintered body, comprising the steps of applying pressure to fine powder particles of one of an electrically conductive material and an electrically semiconductive material, applying a pulse voltage between the fine particles which are kept under the pressure, for thereby causing an electric discharge between the fine particles, and fusing the fine particles together with an energy generated by the electric discharge.

According to the present invention, there is also provided a further method of manufacturing a porous sintered body, comprising the steps of applying pressure to a uniformly dispersed mixture of fine particles of an electrically conductive material and an electrically semiconductive material, while the uniformly dispersed mixture is being held in a mold, applying a pulse voltage between the fine particles which are kept under the pressure, for thereby causing an electric discharge between the fine particles, and fusing the fine particles together with an energy generated by the electric discharge.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

In the following description, a porous sintered body is made of an electrically conductive material. However, a porous sintered body according to the present invention may also be made of an electrically semiconductive material.

Figure 1:
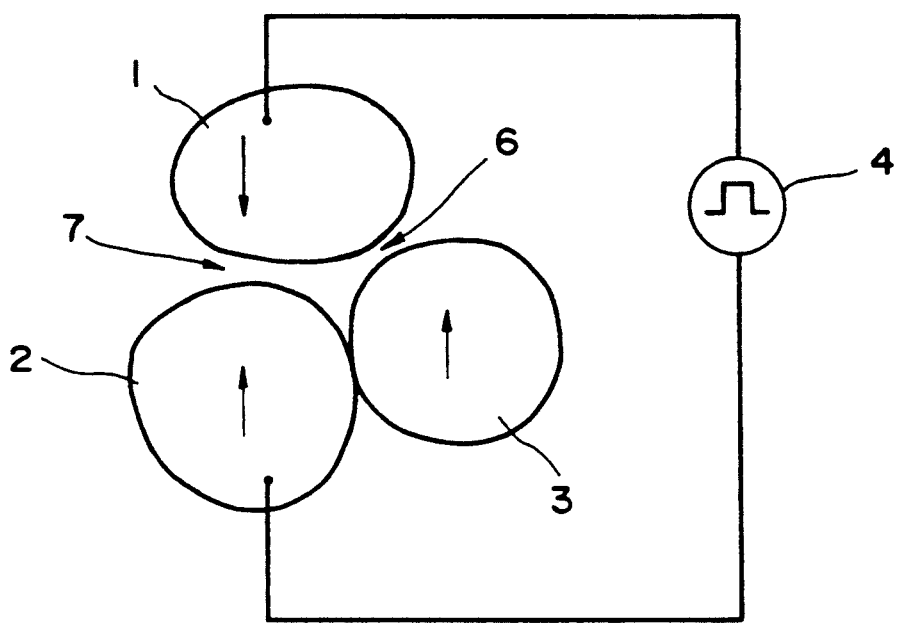
FIG. 1 is a diagram showing a model for manufacturing a porous sintered body according to the present invention.

FIG. 1 schematically shows a model for manufacturing a porous sintered body according to the present invention. In FIG. 1, the reference numeral 1 denotes a fine particle of electrically conductive material which has a diameter of 10 $\mu$m or smaller, and the reference numerals 2, 3 also denote fine particles of the same material as that of the fine particle 1. The fine conductive particle 3 is joined to the fine conductive particle 2. A pulse power supply 4 generates a sharp pulse voltage.

When an instantaneous pulse voltage is applied between the fine conductive particle 1 and the fine conductive particles 2, 3 by the pulse power supply 4, the electric field across gaps 6, 7 between the fine conductive particles is built up in intensity. As the intensity of the electric field exceeds a predetermined voltage, a dielectric breakdown occurs between the fine conductive particle 1 and the fine conductive particles 2, 3, producing a spark discharge across the gaps 6, 7. At this time, electrons emitted from the fine conductive particles 2, 3 and ion bombardment on the fine conductive particle 1 remove thin films, such as oxide films, attached to the surfaces of these fine conductive particles, thereby sufficiently purifying the surfaces of the fine conductive particles. The spark discharge produces a large pressure between the fine conductive particles, and the impulse pressure due to the spark discharge imparts distortion to the fine conductive particles. Joule heat generated by a subsequently flowing current spreads from points where the fine conductive particles are close to each other, easily making the fine conductive particles plastically deformable. Since the pressure is imposed between the fine conductive particle 1 and the fine conductive particles 2, 3 in the directions indicated by the arrows, these particles 1 and 2, 3 are moved toward each other, and brought into contact through small points. Atoms of the fine conductive particles are therefore efficiently diffused and moved through these points of contact.

At first little plastic deformation takes place on the fine conductive particles, and the fine conductive particles move toward each other. The areas through which the fine conductive particles contact each other are progressively spread. Consequently, more and more fine conductive particles are packed into a space having a unit volume. As the areas through which the fine conductive particles contact each other are spread, the contact resistance therebetween is greatly reduced, along with the amount of heat generated. Therefore, the contacting regions of the fine conductive particles are cooled, and melted portions thereof are solidified and the fine conductive particles are firmly bonded to each other.

The above process is not continuously carried out at one time. More specifically, the duration of a pulse voltage applied between fine conductive particles is very short, and hence the application of a pulse voltage is interrupted while the fine conductive particles are moving toward each other. Therefore, the spark discharge produced across the gaps 6, 7 between the fine particles is also interrupted. The generation of heat is also interrupted, and the temperature near the gaps is not increased to the point where the fine conductive particles, even if they are of a diameter of 10 $\mu$m or less, are melted and collapse, and this temperature is kept below the recrystallization temperature at all times. When a next pulse voltage is applied across the gaps 6, 7, the above action occurs again. The discharge of the above nature is repeated until the fine conductive particles 1 and 2, 3 are brought into contact and bonded to each other. The repeated application of pulse voltages causes the fine conductive particles to be sufficiently joined to each other, resulting in a porous sintered body, after which the pressure applied to the porous sintered body is further increased so that any regions where bonding is not sufficient will be firmly bonded.

Figure 2:
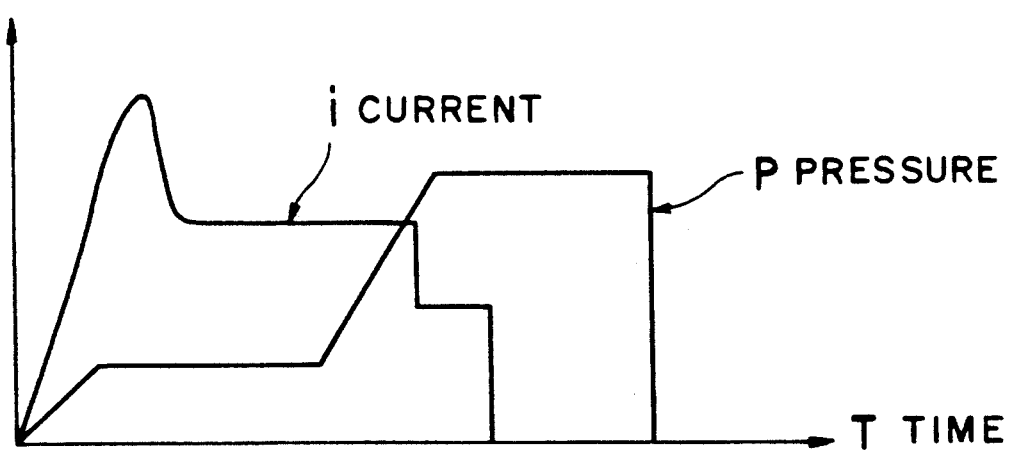
FIG. 2 is a graph showing the pressure applied to fine particles of electrically conductive material, and the average current flowing through the fine particles, as they change with time.

FIG. 2 illustrates the pressure applied to fine conductive particles and the average current flowing through the fine conductive particles, as they change with time.

If only a DC voltage were applied between fine conductive particles which are 10 $\mu$m or less across, the spark discharge would continue for a long period of time until the fine conductive particles are brought into contact with each other, and the spark discharge would develop into a glow discharge, with the result that the temperature in the vicinity of the gaps 6, 7 would rise to the degree that the fine conductive particles would be melted entirely. Therefore, the fine conductive particles would be melted and collapse away into a large mass of electrically conductive material, and no porous sintered body would be formed.

After the above process shown in FIGS. 1 and 2, a curing process may be carried out by applying a continuous DC voltage to the porous sintered body and applying a higher pressure to the porous sintered body, thus increasing the mechanical strength of bonded regions between the fine conductive particles.

Figure 3:
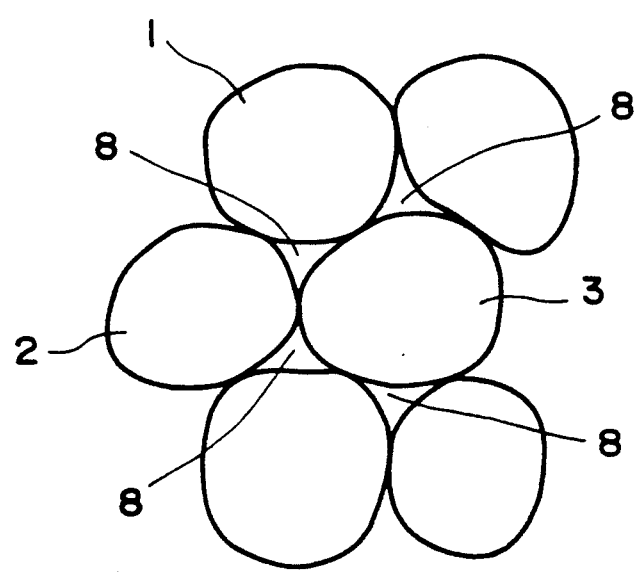
FIG. 3 is a cross-sectional view of a porous sintered body which is formed by a process according to the present invention.

FIG. 3 cross-sectionally shows a porous sintered body which has been formed by the above method. As shown in FIG. 3, many fine conductive particles including the fine conductive particles 1, 2, 3 are firmly bonded to each other, with gaps 8 being reliably formed between the fine conductive particles.

Figure 4:
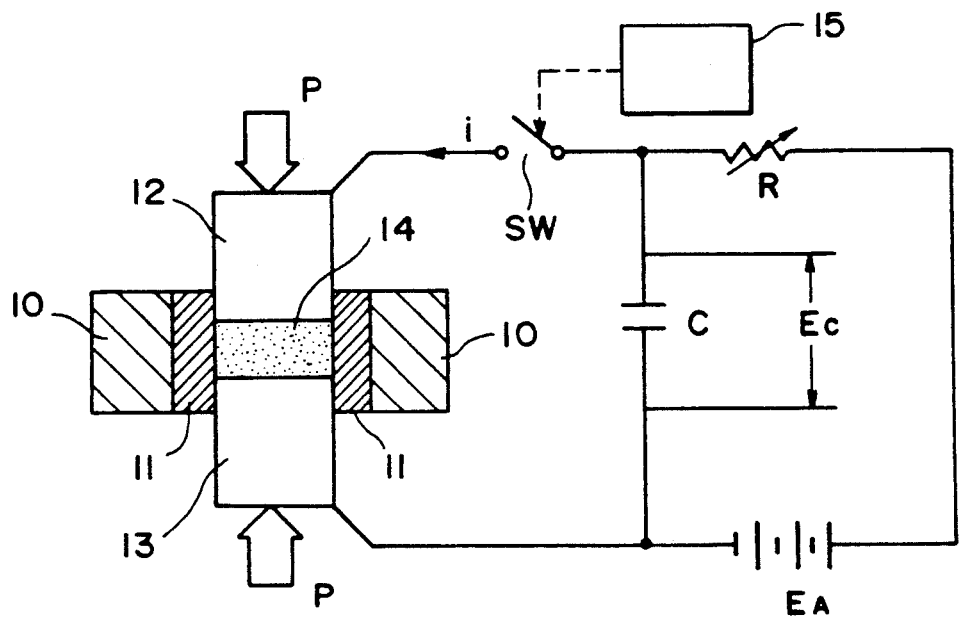
FIG. 4 is a circuit diagram showing an apparatus for manufacturing a porous sintered body according to the present invention.
Figure 5:
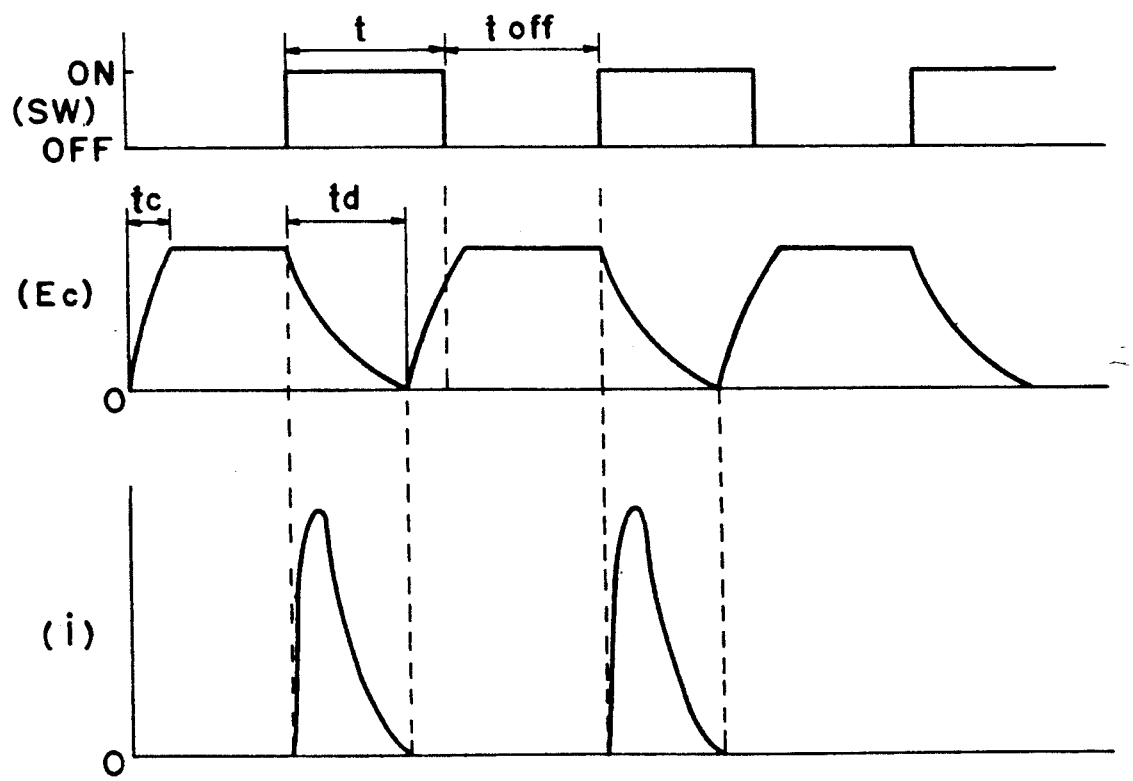
FIG. 5 is a timing chart showing a discharged condition.

FIG. 4 schematically shows an apparatus for manufacturing a porous sintered body according to the present invention. Fine powder particles of electrically conductive material are placed in a sintering mold 10. The sintering mold 10 is made of a high strength metallic material such as tungsten steel, and has a central hole for placing fine conductive particles therein. The inner wall of the hole is coated with an insulating material such as silicon dioxide ($SiO_2$) or silicon nitride ($Si_3N_4$) by a known process such as vapor growth, thus forming an insulating layer 11. Upper and lower electrodes 12, 13 have lower and upper ends, respectively, inserted in the hole in the sintering mold 10. The upper and lower electrodes 12, 13 are made of a heatresistant metal such as tungsten, molybdenum, or the like. Fine particles 14 of electrically conductive material are sealed between the upper and lower electrodes 12, 13. Although not shown in FIG. 4, the upper and lower electrodes 12, 13 are controllably hydraulically pressed with pressure in the directions indicated by the arrows so that a desired pressure can be applied to the fine conductive particles 14. The fine conductive particles 14 and the sintering mold 10 are placed in a desired atmosphere. The upper and lower electrodes 12, 13 are electrically connected to a seriesconnected circuit of a switch SW and a capacitor C, and a series-connected circuit of a variable resistor R and a variable-voltage power supply EA, connected in parallel with the capacitor C. The on- and off-times of the switch SW are controlled by a switch control circuit 15.

The sintering mold 10 may alternatively be made of a ceramic material such as silicon dioxide ($SiO_2$), silicon nitride ($Si_3N_4$), silicon carbide (SiC), or the like.

Operation of the apparatus shown in FIG. 4 will be described below.

While the capacitor C is being fully charged, the switch SW is turned on. At this time, a voltage Ec is applied across the capacitor C. The on-time $t_{on}$ of the switch SW is controlled so that it is longer than a discharge time $t_d$ in which the capacitor C is discharged between the upper and lower electrodes 12, 13. The off-time of the switch SW is controlled so that it is substantially equal to a charge time tc in which the capacitor C can be charged. Therefore, a current i flowing between the upper and lower electrodes 12, 13 can be of a maximum value. Then, the upper and lower electrodes 12, 13 are driven toward each other, progressively increasing the pressure applied to the fine conductive particles 14. Now, the average current flowing between the upper and lower electrodes is is progressively increased.

When the pressure imposed on the fine conductive particles 14 has reached a predetermined value, the process of increasing the pressure is stopped, and the average discharge current that flows due to the discharge of the capacitor C is kept at a prescribed level by either increasing the off-time $t_{off}$ of the switch SW or shortening the on-time $t_{on}$ of the switch SW. This condition is continued for a certain period of time until almost all the fine conductive particles are brought into contact and fused to each other. Thereafter, the pressure applied to the fine conductive particles 14 is increased to a level several times higher, within a predetermined period of time. Since almost all the fine conductive particles have already been fused into a porous sintered body by this time, the discharge current which flows is not appreciably increased. With the pressure being maintained, the discharge voltage applied between the upper and lower electrodes 12, 13 is turned off. When the temperature of the porous sintered body has dropped to normal temperature, the pressure applied thereto is cut off, and the porous sintered body is removed from the sintering mold 10.

Any electrically conductive or semiconductive materials may be used as the material of the fine particles used in the present invention. Particularly suitable are electrically conductive materials of high melting point including indium, osmium, rhenium, tantalum, titanium, zirconium, and carbon, and electrically semiconductive materials of high melting point including silicon and boron.

Fine particles may be brought into repeated collision with each other by spraying so that they are infinitely spherical in shape. A porous sintered body composed of such fine particles has uniform pores between the fine particles.

INVENTIVE EXAMPLE 1

0.345 g of fine particles of carbon (i.e., fine particles of activated carbon which have a specific surface of 1600 $cm^2/g$) having a diameter of several $\mu m$ was treated according to the process described above, thereby producing a thin disc-shaped porous sintered body of fine carbon particles. To check the porosity of the porous sintered body thus formed, an electric double layer capacitor was produced using such disc-shaped porous sintered bodies as polarized electrodes, and then measured for electrostatic capacitance. The measured electrostatic capacitance was 32 farads. There was also produced according to Comparative Example an electric double layer capacitor having paste electrodes which were fabricated from a paste of 0.345 g of fine particles of carbon (i.e. fine particles of activated carbon which have a specific surface of 1600 $cm^2/g$) having a diameter of several $\mu m$ and mixed with a diluted solution of sulfuric acid. The Comparative electric double layer capacitor had an electrostatic capacitance of 26.5 farads. Comparison between the Inventive and Comparative porous sintered bodies indicates that many pores are created between the fine carbon particles in the thin disc-shaped porous sintered body of the present invention which which is made up of only fine carbon particles.

INVENTIVE EXAMPLE 2

1.9 g of fine particles of tungsten having a diameter of 10 $\mu m$ were treated according to the process described above, thereby producing a thin disc-shaped porous sintered body of fine tungsten particles. To inspect the porosity of the porous sintered body thus fabricated, 0.3 cc of water was dropped onto the disc-shaped porous sintered body. The water was entirely absorbed by the disc-shaped porous sintered body. When more water droplets were further dropped onto the disc-shaped porous sintered body, the water passed through the disc-shaped porous sintered body, and formed water droplets on the lower surface thereof.

With the present invention, as described above in detail, only fine particles of electrically conductive or semiconductive material having a diameter of 10 $\mu m$ or less, or a uniformly dispersed mixture of fine particles of electrically conductive material having a diameter less and fine particles of electrically semiconductive material having a diameter of 10 $\mu m$ or less, are bonded together without using any particle binders whatsoever, thereby forming a porous sintered body. Since the fine particles which are 10 $\mu m$ or less across are reliably bonded together, there can be produced a filter having uniform pores and good filter characteristics.

As the fine particles which are 10 $\mu m$ or less across are bonded together, the pores or gaps between the fine particles are small, about several $\mu m$. If the porous sintered body according to the present invention is used as a filter, then it can reliably remove bacteria such as colitis germs from solutions.

Inasmuch as many fine particles having a diameter of 10 $\mu m$ or smaller can be packed into a unit volume, the surface area of the resultant porous sintered body is increased. If the porous sintered body according to the present invention is employed as a polarized electrode for an electric double layer capacitor, therefore, the electric double layer capacitor has a very large electrostatic capacitance.

According to the manufacturing method of the present invention, a porous sintered body can be manufactured with a lower pressure and a shorter sintering time than the conventional sintering methods.

Although a certain preferred embodiment has been shown and described, it should be understood that many changes and modifications may be made therein without departing from the scope of the appended claims.

What is claimed is:

1. A porous sintered body comprising fine particles of one of an electrically conductive material and an electrically semiconductive material, said fine particles having a diameter of less than or equal to about 10 μm, said fine particles being fused together at areas of contact with each other under a pulse voltage applied between said fine particles.

2. A porous sintered body according to claim 1, wherein said electrically conductive material is selected from the group consisting of carbon, indium, osmium, rhenium, tantalum, titanium, and zirconium, and said electrically semiconductive material is selected from the group consisting of silicon and boron.

3. A porous sintered body according to claim 1, wherein said fine particles are substantially spherical in shape.

4. A porous sintered body comprising a uniformly dispersed mixture of fine particles of an electrically conductive material and an electrically semiconductive material, said fine particles having a diameter of less than or equal to about 10 μm, said fine particles being fused together at areas of contact with each other under a pulse voltage applied between said fine particles.

5. A porous sintered body according to claim 4, wherein said electrically conductive material is selected from the group consisting of carbon, indium, osmium, rhenium, tantalum, titanium, and zirconium, and said electrically semiconductive material is selected from the group consisting of silicon and boron.

6. A porous sintered body according to claim 4, wherein said fine particles are substantially spherical in shape.

7. A method of manufacturing a porous sintered body, comprising the steps of:
applying pressure to fine powder particles of one of an electrically conductive material and an electrically semiconductive material;
applying a pulse voltage between the fine powder particles to which the pressure is being applied, so as to cause an electric discharge between the fine powder particles; and
fusing the fine powder particles together with energy generated by the electric discharge.

8. A method of manufacturing a porous sintered body, comprising the steps of:
applying pressure to a uniformly dispersed mixture of fine particles of an electrically conductive material and an electrically semiconductive material, while said uniformly dispersed mixture is being held in a mold;
applying a pulse voltage between the fine particles to which the pressure is being applied, so as to cause an electric discharge between the fine particles; and
fusing the fine particles together with energy generated by the electric discharge.

9. A porous sintered body according to claim 1, wherein said fine particles comprise said electrically conductive material, said electrically conductive material being selected from the group consisting of carbon, indium, osmium and rhenium.

10. A porous sintered body according to claim 4, wherein said electrically conductive material is selected from the group consisting of carbon, indium, osmium and rhenium.

11. A method of manufacturing a porous sintered body according to claim 7, wherein said fine powder particles comprise said electrically conductive material, said electrically conductive material being selected from the group consisting of carbon, indium, osmium and rhenium.

12. A method of manufacturing a porous sintered body according to claim 8, wherein said electrically conductive material is selected from the group consisting of carbon, indium, osmium and rhenium.

13. A porous sintered body according to claim 1, wherein said fine particles comprise said electrically semiconductive material, said electrically semiconductive material being selected from the group consisting of silicon and boron.

14. A porous sintered body according to claim 4, wherein said electrically semiconductive material is selected from the group consisting of silicon and boron.

15. A method of manufacturing a porous sintered body according to claim 7, wherein said fine powder particles comprise said electrically semiconductive material, said electrically semiconductive material being selected from the group consisting of silicon and boron.

16. A method of manufacturing a porous sintered body according to claim 8, wherein said electrically semiconductive material is selected from the group consisting of silicon and boron.

* * * * *